United States Patent
Saito et al.

(10) Patent No.: US 10,303,927 B2
(45) Date of Patent: May 28, 2019

(54) PEOPLE SEARCH SYSTEM AND PEOPLE SEARCH METHOD

(71) Applicant: Kabushiki Kaisha Toshiba, Minato-ku (JP)

(72) Inventors: Hiroo Saito, Kawasaki (JP); Toshio Sato, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/257,225

(22) Filed: Sep. 6, 2016

(65) Prior Publication Data

US 2017/0068845 A1   Mar. 9, 2017

(30) Foreign Application Priority Data

Sep. 7, 2015   (JP) .................. 2015-176118

(51) Int. Cl.
| | | |
|---|---|---|
| *G06K 9/00* | (2006.01) | |
| *H04N 7/18* | (2006.01) | |
| *G06T 7/00* | (2017.01) | |

(52) U.S. Cl.
CPC ..... *G06K 9/00281* (2013.01); *G06K 9/00288* (2013.01); *G06K 9/00295* (2013.01);
(Continued)

(58) Field of Classification Search
CPC .......... G06K 9/00288; G06K 9/00268; G06K 9/00281; G06K 9/00295; G06K 9/00302;
(Continued)

(56) References Cited

U.S. PATENT DOCUMENTS

| | | | | |
|---|---|---|---|---|
| 2013/0247175 | A1* | 9/2013 | Nechyba ................. | G06F 21/32 726/19 |
| 2014/0079299 | A1* | 3/2014 | Sukegawa .......... | G06K 9/00288 382/118 |
| 2015/0125046 | A1 | 5/2015 | Ikenoue et al. | |

FOREIGN PATENT DOCUMENTS

| | | |
|---|---|---|
| JP | 2012-3623 | 1/2012 |
| JP | 2014-182480 A | 9/2014 |

OTHER PUBLICATIONS

Alyuz et al., "3-D Face Recognition Under Occlusion Using Masked Projection", IEEE Transactions on Information Forensics and Security, vol. 8, No. 5, May 2013.*

(Continued)

*Primary Examiner* — Kenny A Cese
(74) *Attorney, Agent, or Firm* — Oblon, McClelland, Maier & Neustadt, L.L.P.

(57) ABSTRACT

According to an embodiment, a people search system includes a receiver, a detector, a search unit, and a display. The search unit obtains features of a first face image and a second face image of a predetermined person and searches for the predetermined person based on a similarity between the features of the first and the second face images when an inhibiting factor is not detected, and generates a third face image that is a composite image of the second face image and the inhibiting factor, obtains features of the first and the third face images, and searches for the predetermined person based on a similarity between the features of the first and the third face images when the inhibiting factor is detected. The display displays the search result of the predetermined person obtained by the search unit.

8 Claims, 3 Drawing Sheets

(52) U.S. Cl.
CPC ............ G06K 9/00771 (2013.01); G06T 7/97 (2017.01); H04N 7/18 (2013.01); *G06T 2207/30201* (2013.01)

(58) Field of Classification Search
CPC ............ G06K 9/00248; G06K 9/6202; G06K 9/00771; H04N 7/18; G06T 7/97
See application file for complete search history.

(56) References Cited

OTHER PUBLICATIONS

Alyuz et al., "3-D Face Recognition Under Occlusion Using Masked Projection".*
Alyuz et al., "3-D Face Recognition Under Occlusion Using Masked Projection", IEEE Transactions on Information Forensics and Security. vol. 8, No. 5, May 2013 (Year: 2013).*
Extended European Search Report dated Jan. 24, 2017 in European Patent Application No. 16187372.4.
Nese Alyuz, et al. 3-D Face Recognition Under Occlusion Using Masked Projection, IEEE Transactions on Information Forensics and Security, XP011500331, vol. 8, No. 5, May 2013, pp. 789-802.
Rui Min, et al. Improving the Recognition of Faces Occluded by Facial Accessories, Automatic Face&Gesture Recognition and Workshops 2011 IEEE International Conference on, XP031869442, Mar. 21, 2011, pp. 442-447.
Mui Min, et al. Improving the Recognition of Faces Occluded by Facial Accessories, Automatic Face&Gesture Recognition and Workshops 2011 IEEE International Conference on, XP031869442, Mar. 21, 2011, pp. 442-447.

\* cited by examiner

PEOPLE SEARCH SYSTEM AND PEOPLE SEARCH METHOD

CROSS-REFERENCE TO RELATED APPLICATIONS

This application is based upon and claims the benefit of priority from Japanese Patent Application No. 2015-176118, filed Sep. 7, 2015, the entire contents of which are incorporated herein by reference.

FIELD

An embodiment described herein relates generally to a people search system and a people search method.

BACKGROUND

People search systems are known that search for a predetermined person based on a similarity calculated between a face image contained in a surveillance image captured by an image-capturing unit provided so as to be capable of capturing people passing through a certain location and a face image of the predetermined person.

In the conventional people search systems, however, when the face image in the surveillance image contains some factors, such as a mask or sunglasses, that inhibit the search for the predetermined person based on the face image, such factors lower the similarity between the face image in the surveillance image and the face image of the predetermined person, which results in lower search accuracy of the predetermined person. To prevent the lower search accuracy of the predetermined person, when the similarity threshold for determining the predetermined person is reduced, search errors of the predetermined person increase, which decrease efficient search for the predetermined person.

DETAILED DESCRIPTION

A people search system according to an embodiment includes a receiver, a detector, a search unit, and a display. The receiver receives image data captured by an image-capturing unit provided so as to be capable of capturing people passing through a first location. The detector detects an inhibiting factor that inhibits a search for a predetermined person based on a face image from a first face image contained in the image data. If the inhibiting factor has not been detected, a search unit obtains a feature of the first face image and a feature of a second face image of the predetermined person, and searches for the predetermined person based on a similarity between the feature of the first face image and the feature of the second face image. If the inhibiting factor has been detected, the search unit generates a third face image that is a composite image of the second face image and the inhibiting factor, obtains the feature of the first face image and a feature of the third face image, and searches for the predetermined person based on a similarity between the feature of the first face image and the feature of the third face image. The display displays a search result of the predetermined person obtained by the search unit.

Described below are a people search system and people search method according to an embodiment with reference to the accompanying drawings.

Figure 1:
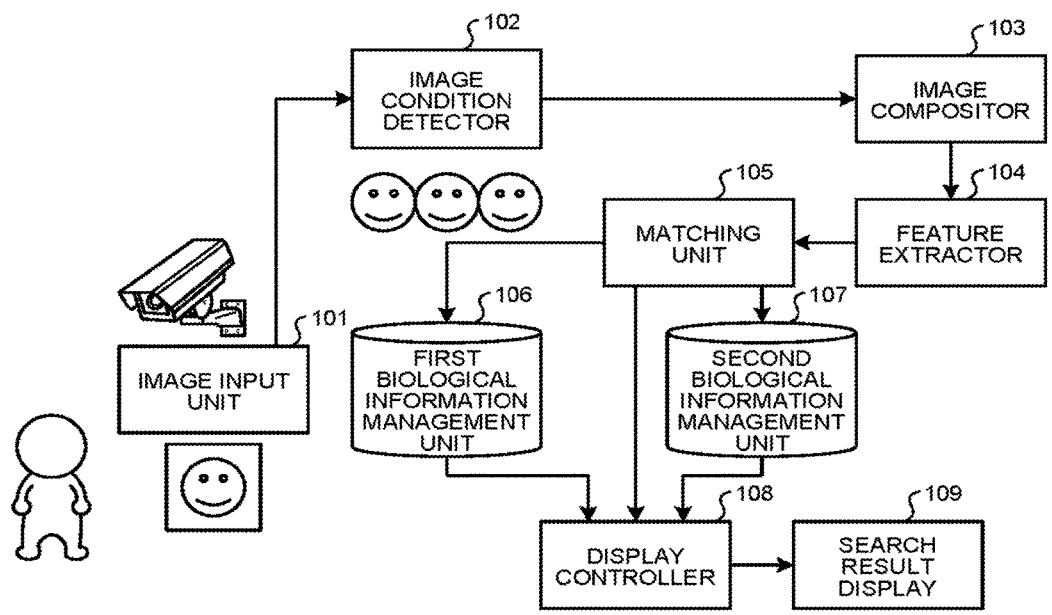
FIG. 1 is a diagram illustrating a configuration example of a people search system according to an embodiment.

FIG. 1 is a diagram illustrating a configuration example of the people search system according to the embodiment. The people search system in the present embodiment is applied to an entry/exit control system or a video surveillance system used in facilities such as public facilities, important facilities, office buildings, or commercial complexes in which a large number of people are passing. As illustrated in FIG. 1, the people search system in the present embodiment include an image input unit 101, an image condition detector 102, an image compositor 103, a feature extractor 104, a matching unit 105, a first biological information management unit 106, a second biological information management unit 107, a display controller 108, and a search result display 109.

The image input unit 101 is configured by, for example, a camera, and is provided so as to be capable of capturing people passing through a certain location (an example of the first location) such as an entrance or an exit of a facility in which the people search system is deployed. The image input unit 101 captures an image of the certain location to obtain image data (hereinafter, referred to as input image data) and outputs the input image data to the image condition detector 102.

The image condition detector 102 (an example of the receiver) receives the input image data output from the image input unit 101. The image condition detector 102 (an example of the detector) detects an inhibiting factor from a captured face image (an example of the first face image) that is a face image contained in the received input image data. The inhibiting factor is a factor that inhibits a search for predetermined person based on a face image. Examples of the inhibiting factor include facial expressions such as a smile or closed eyes, concealment on the face image by mustache or beard, or bangs, human races, facial orientation, headwear, glasses, sunglasses, accessories, lighting conditions, and image quality.

In the present embodiment, the image condition detector 102 determines whether the captured face image includes a smile or closed eyes by performing a regression analysis that analyzes the relation between the captured face image and a pre-registered face image including a smile or closed eyes. The image condition detector 102 determines whether the captured face image includes mustache or beard based on luminance values of a lower part of the captured face image. The image condition detector 102 determines whether the captured face image is a face image concealed by bangs by performing a regression analysis that analyzes the relation between the captured face image and a pre-registered face image concealed by bangs.

The image condition detector 102 determines whether the face in the captured face image is in an orientation, such as sideward or downward, that inhibits the search for the predetermined person by detecting positions of the eyes and the nose included in the captured face image, and comparing the detected positions of the eyes and the nose with the positions of the eyes and the nose in a three-dimensional model. The image condition detector 102 determines whether the captured face image includes headwear, glasses, sunglasses, or accessories by using a pattern recognition model such as a support vector machine (SVM). The image condition detector 102 determines whether the image captured by the image input unit 101 was captured in a lighting condition that inhibits the search for the predetermined person based on, for example, the image conditions of the image input unit 101 and the distribution of luminance values in the captured face image. The image condition detector 102 determines whether the image quality of the captured face image is at such a level that inhibits the search for the predetermined person based on a compression coefficient of a compression method such as joint photographic experts group (PEG) used in compressing the input image data containing the captured face image.

If the image condition detector 102 detects an inhibiting factor, the image compositor 103 generates a composite face image an example of the third face image) that a composite image of a registered face image (an example of the second face image) that is a face image stored in the first biological information management unit 106 to be described later and the inhibiting factor detected by the image condition detector 102. The image compositor 103 outputs the generated composite face image to the feature extractor 104. In the present embodiment, when the image condition detector 102 detects an inhibiting factor, the image compositor 103 generates a composite face image that combines only the detected inhibiting factor with the registered face image. This configuration eliminates the need for combining other inhibiting factors than the detected inhibiting factor with the registered face image, which can reduce the time for generating the composite face image. If the image condition detector 102 detects no inhibiting factor, the image compositor 103 generates no composite face image, and outputs the registered face image to the feature extractor 104.

The feature extractor 104 obtains a feature of the captured face image contained in the input image data received from the image input unit 101. In the present embodiment, the feature extractor 104 moves a certain template in the input image data to obtain correlation values between regions in the input image data and the template. The certain template is a template set in advance to specify the face image. The feature extractor 104 extracts, as the captured face image, a region in the input image data that has the highest correlation value with the template. Although, in the present embodiment, the feature extractor 104 extracts the captured face image from the input image data by using a certain template, the embodiment is not limited to this. The feature extractor 104 may extract the captured face image from the input image data by using the eigenspace method or the subspace method.

The feature extractor 104 detects positions of characteristic parts (hereinafter referred to as facial parts) such as the eyes and the nose in a face image from the extracted captured face image. The feature extractor 104 obtains a feature that represents the face image in a numerical value based on the detected positions of the facial parts. Specifically, the feature extractor 104 cuts out a region having a certain size from the captured face image based on the detected positions of the facial parts. The feature extractor 104 obtains shading information of the cut-out region as the feature of the region. For example, the feature extractor 104 cuts out a region of m×n pixels from the captured face image based on the detected position of the facial parts, and obtains the feature vector of m×n dimensions that represents the shading of the cut-out region of m×n pixels.

If the image condition detector 102 detects no inhibiting factor from the captured face image, the feature extractor 104 obtains a feature of the registered face image input from the image compositor 103. If the image condition detector 102 detects an inhibiting factor from the captured face image, the feature extractor 104 obtains a feature of the composite face image input from the image compositor 103. In the present embodiment, the feature extractor 104 obtains the feature of the registered face image or the compo cite face image in the same manner as in the process of obtaining the feature of the captured face image.

If the image condition detector 102 detects no inhibiting factor, the matching unit 105 performs search processing for the predetermined person based on the similarity between the feature of the captured face image and the feature of the registered face image. The matching unit 105 stores a result of the search processing in the second biological information management unit 107. In the present embodiment, the matching unit 105 calculates the similarity between the feature of the captured face image and the feature of the registered face image, and if the calculated similarity exceeds a certain threshold, the matching unit 105 determines that the predetermined person a found. If the calculated similarity is equal to or lower than the certain threshold, the matching unit 107 determines that the predetermined person has not been found. The certain threshold is the lower limit value of similarity above which the captured face image is determined to be the face image of the predetermined person.

In the present embodiment, the matching unit 105 obtains the subspace of the feature of the captured face image and the subspace of the feature of the registered face image. The matching unit 105 determines that the similarity between the obtained subspaces is the similarity between the feature of the captured face image and the feature of the registered face image. Specifically, the matching unit 105 calculates an angle formed by the two subspaces as the similarity between the two subspaces by using the subspace method or the multiple similarity method. The matching unit 105 may obtain the similarity between the feature of the captured face image and the feature of the registered face image by using the Euclidean distance or the Mahalanobis distance in the feature space as a similarity index other than the similarity. When distance is used as a similarity index, a larger value indicates a lower similarity.

If the image condition detector 102 detects an inhibiting factor, the matching unit 105 performs search processing for the predetermined person based on the similarity between the feature of the captured face image and the feature of the composite face image. As described above, when the image condition detector 102 detects an inhibiting factor, the search for the predetermined person is performed by using a composite face image that is a composite image of the inhibiting factor and the registered face image. This configuration can keep the search rate and search accuracy stable in searching for the predetermined person compared to a case in which the search for the predetermined person is performed by using a registered face image that does not contain any inhibiting factor. The matching unit 105 stores a result of the search processing in the second biological information management unit 107. In the present embodiment, the matching unit 105 calculates the similarity between the feature of the captured face image and the feature of the composite face image in the same manner as in the process of calculating the similarity between the feature of the captured face image and the feature of the registered face image. If the calculated similarity exceeds a certain threshold, the matching unit 105 determines that the predetermined person is found. If the calculated similarity is equal to or lower than the certain threshold, the matching unit 155 determines that the predetermined person has not been found. In the present embodiment, the image compositor 103, the feature extractor 104, and the matching unit 105 function as an example of the search unit.

When the matching unit 105 find out the predetermined person, the first biological information management unit 106 stores therein the captured face image that has been used for searching for the predetermined person as a registered face image in association with the feature of the captured face image and identification (ID) information (for example, name, sex, age, or height of the predetermined person) by which the predetermined person can be identified. When the matching unit 105 uses the composite face image in searching for the predetermined person, the first biological information management unit 106 stores therein the composite face image as a registered face image in association with the feature of the composite face image and the ID information. The first biological information management unit 106 may store therein, for example, the subspace of the captured face image or the composite face image, or a correlation matrix instead of storing the feature of the captured face image or the composite face image. The second biological information management unit 107 stores therein results of the search processing performed by the matching unit 105.

The display controller 108 displays the search result of the predetermined person obtained by the matching unit 105 on the search result display 109. In the present embodiment, if the similarity between the feature of the captured face image and the feature of the composite face image is equal to or higher than the certain threshold, the display controller 108 displays the captured face image, the registered face image, and the composite face image on the search result display 109. If the similarity between the feature of the captured face image and the feature of the composite face image is lower than the certain threshold, the display controller 108 displays the captured face image and the composite face image except the registered face image on the search result display 109.

The search result display 109 (an example of the display) is configured by, for example, a liquid crystal display (LCD), and can display various kinds of information. In the present embodiment, the search result display 109 is provided such that the search result display 109 can be viewed by, for example, monitoring personnel of the people search system. By viewing the information displayed on the search result display 109, the monitoring personnel of the people search system can recognize whether the predetermined person has been found.

Figure 2:
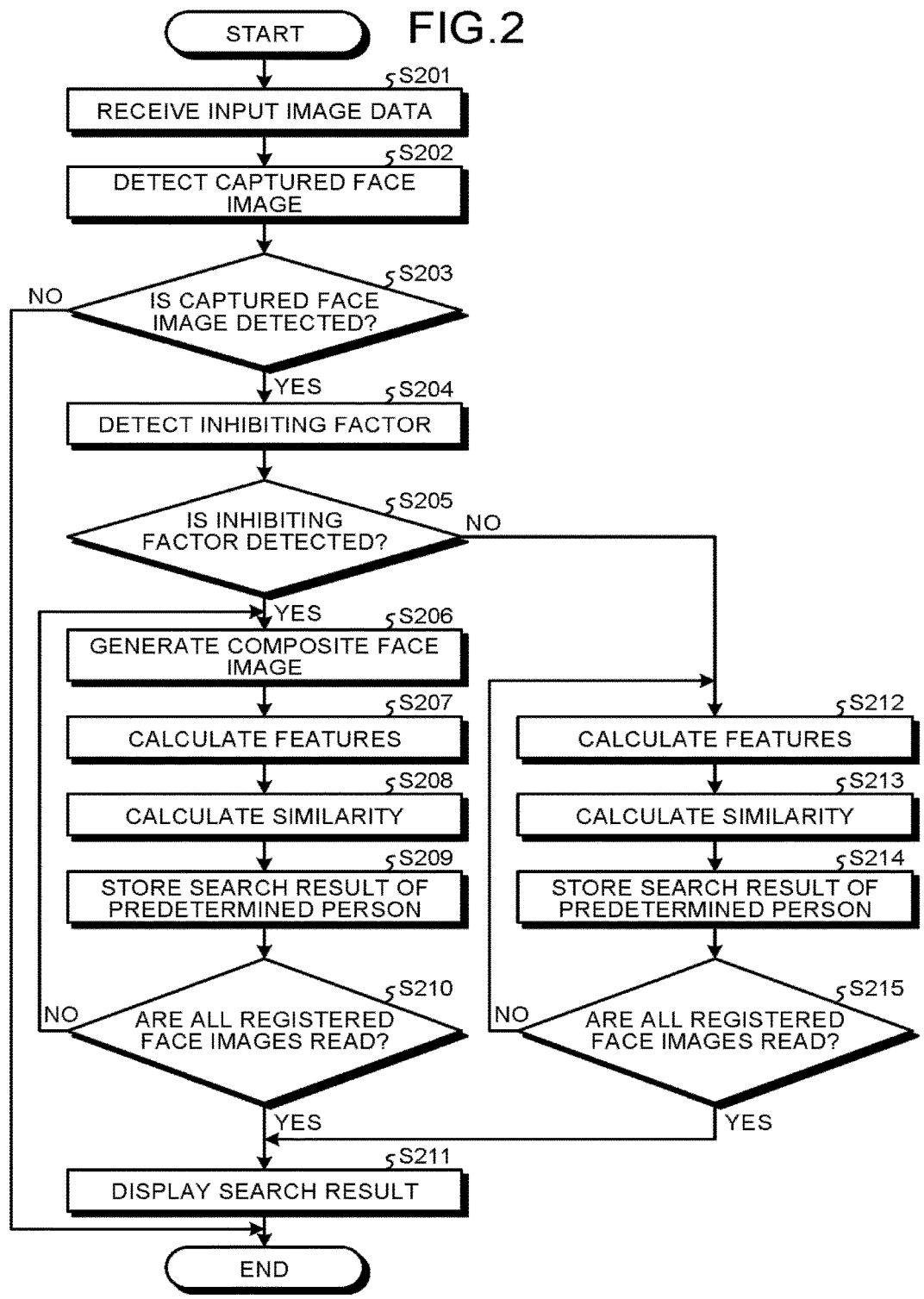
FIG. 2 is a flowchart illustrating an example of the procedure of search processing for a predetermined person in the people search system in the embodiment.
Figure 3:
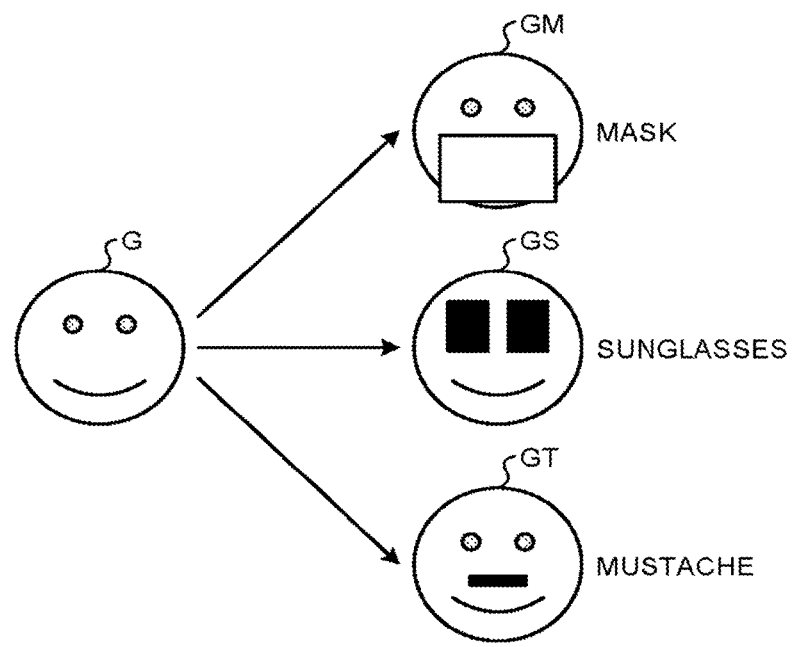
FIG. 3 is a diagram illustrating an example of generation processing for generating composite face images in the people search system in the embodiment.
Figure 4:
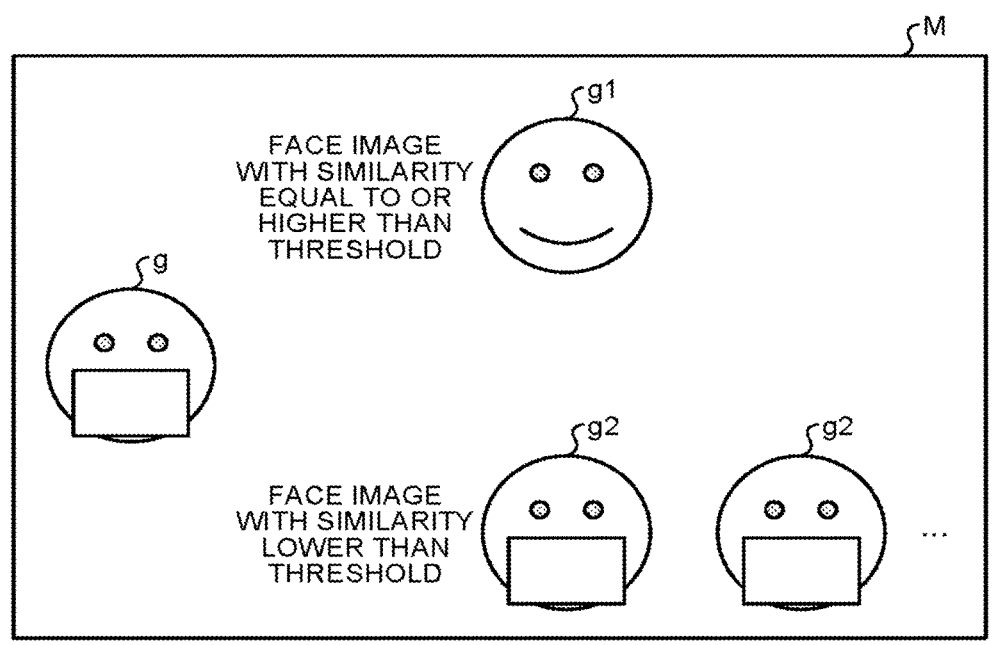
FIG. 4 is a diagram illustrating a display example of a search result of a predetermined person in the people search system in the embodiment.

Described next is search processing for a predetermined person in the people search system in the present embodiment with reference to FIGS. 2 to 4. FIG. 2 is a flowchart illustrating an example of the procedure of the search processing for a predetermined person in the people search system in the embodiment. FIG. 3 is a diagram illustrating an example of generation processing for generating composite face images in the people search system in the embodiment. FIG. 4 is a diagram illustrating a display example of a search result of the predetermined person the people search system in the embodiment.

The image condition detector 102 receives input image data from the image input unit 101 (Step S201). The image condition detector 102 then detects a captured face image contained in the received input image data (Step S202). In the present embodiment, the image condition detector 102 moves a certain template in the input image data to obtain correlation values between regions in the input image data and the template, and determines a region having the highest correlation value to be the captured face image, in the same manner as the feature extractor 104 does.

If no captured face image has been detected from the input image data (No at Step S203), the image condition detector 102 ends the search processing for the predetermined person based on this input image data, and waits for reception of new input image data. If any captured face image is detected from the input image data (Yes at Step S203), the image condition detector 102 detects an inhibiting factor such as sunglasses from the detected captured face image (Step S204). If any inhibiting factor is detected from the captured face image (Yes at Step 205), the image compositor 103 reads a registered face image stored in the first biological information management unit 106, and generates a composite face image by combining the detected inhibiting factor with the read registered face image (Step S206).

For example detected inhibiting factor is a mask, the image compositor 103 generates a composite face image GM by combining only the mask with a registered face image G as illustrated in FIG. 3. When the detected inhibiting factor is sunglasses, the image compositor 103 generates a composite face image GS by combining only the sunglasses with the registered face image G as illustrated in FIG. 3. When the detected inhibiting factor is mustache, the image compositor 103 generates a composite face image GT by combining only the mustache with the registered face image G as illustrated in FIG. 3. This configuration eliminates the need for combining other inhibiting factors than the detected inhibiting factor with the registered face image G, which can reduce the time for generating the composite face image.

Referring back to FIG. 2, the feature extractor 104 calculates a feature of the composite face image generated by the image compositor 103 and a feature of the captured face image (Step S207). Subsequently, the matching unit 105 calculates the similarity between the feature of the captured face image and the feature of the composite face image, and searches for the predetermined person based on the calculated similarity (Step S208). As described above, when the image condition detector 102 detects an inhibiting factor, the search for the predetermined person performed by using a composite face image that is a composite image of the inhibiting factor and the registered face image. This configuration can keep the search rate and search accuracy stable in searching for the predetermined person compared to a case in which the search for the predetermined person is performed by using a registered face image that does not contain any inhibiting factor.

Subsequently, the matching unit 105 stores information relating to the search for the predetermined person such as the calculated similarity as a search result of the predetermined person in the second biological information management unit 107 (Step S209). When the matching unit 105 has found the predetermined person based on the calculated similarity, the matching unit 105 stores the composite face image as a registered face image in association with the feature of the composite face image and the ID information of the predetermined person in the first biological information management unit 106.

The matching unit 105 then determines whether all the registered face images stored in the first biological information management unit 106 are read (Step S210). If the matching unit 105 determines that all the registered face images are not read (No at Step S210), the process returns to Step S206 and the image compositor 103 reads another registered face image from the first biological information management unit 106, and generates a composite face image by combining the detected inhibiting factor with the read registered face image.

If the matching unit 105 determine that all the registered face images are read (Yes at Step S210), the display controller 108 displays the search result of the predetermined person obtained by the matching unit 105 on the search result display 109 (Step S211). In the present embodiment, as illustrated in FIG. 4, if the similarity between the feature of the captured face image and the feature of the composite face image is equal to or higher than the certain threshold (that is, when the predetermined controller is found by the matching unit 105), the display controller 108 displays, on the search result display 109, a screen M that contains a captured face image g, a predetermined person image g1 that is a composite face image whose similarity to the captured face image is equal to or higher than the certain threshold among the composite face images generated by the image compositor 103, and a candidate image g2 that is a composite face image whose similarity to the captured face image is determined to be lower than the certain threshold among the generated composite face images. When a plurality of the candidate images g2 are included in the screen M, the display controller 108 displays the candidate images g2 in descending order of similarity to the captured face image g on the screen M.

If the similarity between the feature of the captured face image and the feature of the composite face image is lower than the certain threshold (that is, when the predetermined person has not been found by the matching unit 105), the display controller 108 has no composite image similar to the captured face image, and thus the predetermined person image g1 is not included in the screen M. This configuration allows the monitoring personnel of the people search system to easily recognize whether the predetermined person has been found by checking whether the predetermined person image is displayed on the search result display 109.

Referring back to FIG. 2, if no inhibiting factor has been detected from the captured face image (No at Step S205), the feature extractor 104 reads a registered face image from the first biological information management unit 106. The feature extractor 104 calculates the feature of the captured face image and the feature of the read registered face image (Step S212). Subsequently, the matching unit 105 calculates the similarity between the feature of the captured face image and the feature of the registered face image, and searches for the predetermined person based on the calculated similarity (Step S213). As described above, when the image condition detector 102 detects no inhibiting factor, the search for the predetermined person is performed by using the registered face image without generating the composite face image. This configuration can reduce the time for generating the composite face image, which leads to an efficient search for the predetermined person. The matching unit 105 then stores information relating to the search for the predetermined such as the calculated similarity as a search result of the predetermined person in the second biological information management unit 107 (Step S214).

Subsequently, the matching unit 105 determines whether all the registered face images stored in the first biological information management unit 106 are read (Step S215). If the matching unit 105 determines that all the registered face images are not read (No at Step S215), the process returns to Step S212 and the image compositor 103 reads another registered face image from the first biological information management unit 106, and outputs the read registered face image to the feature extractor 104.

If the matching unit 105 determines that all the registered face images are read (Yes at Step S215), the display controller 108 displays the search result of the predetermined person obtained by the matching unit 105 on the search result display 109 (Step S211). When the search for the predetermined person is performed based on the similarity between the feature of the captured face image and the feature of the registered face image, the display controller 108 displays the search result of the predetermined person in the same manner as in the search for the predetermined person based on the similarity between the feature of the captured face image and the feature of the composite face image.

Specifically, if the similarity between the feature of the captured face image and the feature of the registered face image is equal to or higher than the certain threshold (that is, if the predetermined person is found by the matching unit 105), the display controller 108 displays, on the search result display 109, a screen that includes the captured face image, a predetermined person image that is a registered face image whose similarity to the captured face image is determined to be equal to or higher than the certain threshold among the registered face images, and a candidate image that is a registered face image whose similarity to the captured face image is determined to be lower than the certain threshold among the registered face images. When a plurality of the candidate images are included in the screen, the display controller 108 displays the candidate images in descending order of similarity to the captured face image on the screen.

If the similarity between the feature of the captured face image and the feature of the registered face image is lower than the certain threshold (that is, if the predetermined person has not been found by the matching unit 105), the display controller 108 has no registered face image similar to the captured face image, and thus the predetermined person image is not included in the screen. This configuration allows the monitoring personnel of the people search system to easily recognize whether the predetermined person has been found by checking whether the predetermined person image is displayed on the search result display 109.

As described above, in the people search system in the present embodiment, when an inhibiting factor is detected from a captured face image, a search for a predetermined person is performed by using a composite face image that is a composite image of the inhibiting factor and a registered face image. This configuration can keep the search rate and search accuracy stable in searching for the predetermined person compared to a case in which the search for the predetermined person is performed by using a registered face image that does not contain any inhibiting factor.

While certain embodiment, have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A people search method comprising:
receiving image data captured by an image-capturing unit provided so as to be capable of capturing people passing through a first location;
detecting an inhibiting factor that inhibits a search for a predetermined person based on a face image from a first face image contained in the image data;
obtaining a feature of the first face image and a feature of a second face image of the predetermined person and searching for the predetermined person based on a similarity between the feature of the first face image and the feature of the second face image when the inhibiting factor has not been detected;
generating a third face image that is a composite image of the second face image and the inhibiting factor, obtaining the feature of the first face image and a feature of the third face image, and searching for the predetermined person based on a similarity between the feature of the first face image and the feature of the third face image when the inhibiting factor has been detected;
displaying, when the similarity between the feature of the first face image and the feature of the third face image is equal to or higher than a certain threshold, the first face image, the second face image, and the third face image as a search result of the predetermined person on a display; and
displaying, when the similarity between the feature of the first face image and the feature of the third face image is lower than the certain threshold, the first face image and the third face image except the second face image as the search result.

2. The people search method according to claim 1, wherein the generating includes generating the third face image by combining only the inhibiting factor detected from the first face image with the second face image.

3. The people search method according to claim 1, wherein the detecting includes detecting at least one of concealment, a human race, facial orientation, headwear, glasses, sunglasses, an accessory, a lighting condition, and image quality in the face image as the inhibiting factor.

4. The people search method according to claim 1, wherein when the inhibiting factor has not been detected, the predetermined person is found when the similarity between the feature of the first face image and the feature of the second face image exceeds a certain threshold, and, when the inhibiting factor has been detected, the predetermined person is found when the similarity between the feature of the first face image and the feature of the third face image exceeds the certain threshold.

5. The people search method according to claim 1, further comprising:
storing, as the second face image, the first face image and the third face image that have been used in searching for the predetermined person in association with identification information of the predetermined person in a first storage, wherein
when the inhibiting factor has not been detected, the searching includes searching for the predetermined person based on the similarity between the feature of the first face image and the feature of the second face image stored in the first storage, and, when the inhibiting factor has been detected, the generating includes generating the third face image that is a composite image of the second face image stored in the first storage and the inhibiting factor.

6. The people search method according to claim 1, wherein when the inhibiting factor has not been detected, the third face image is not generated.

7. The people search method according to claim 1, wherein when the similarity between the feature of the first face image and a feature of the third face image is equal to or higher than the certain threshold, the displaying includes displaying third face image whose similarities to the feature of the first face image are lower than the certain threshold among the third face images, in descending order of similarity to the feature of the first face image on the display.

8. The people search method according to claim 1, wherein a search result of the predetermined person is stored in a second storage.

* * * * *